Sept. 13, 1949.    A. K. BJORKMAN    2,481,564
PHYSIOTHERAPY APPARATUS
Filed Feb. 2, 1946
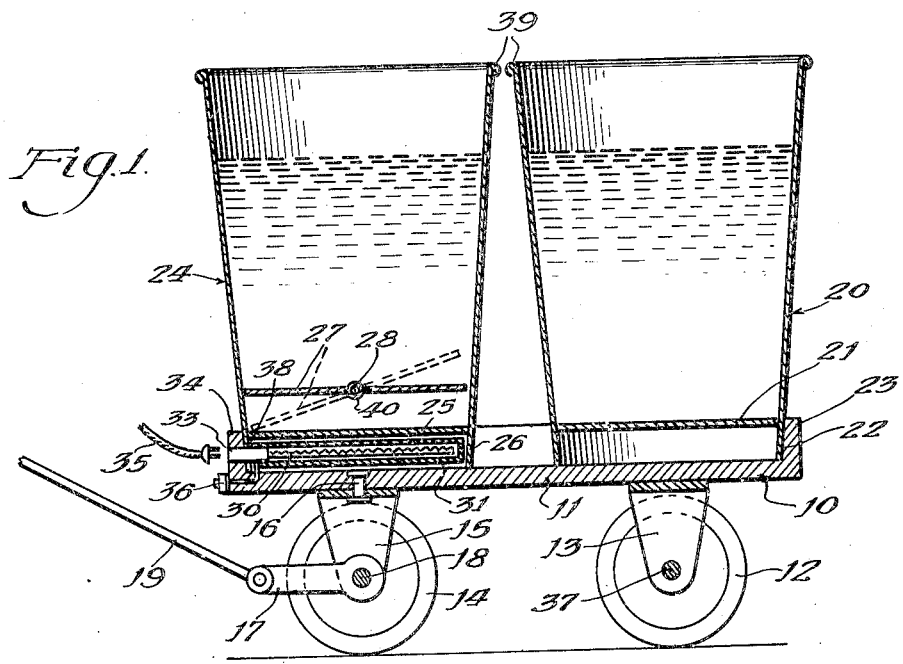
Inventor:
Axel K. Bjorkman
By Wallace and Cannon
Attorneys Patented Sept. 13, 1949

2,481,564

UNITED STATES PATENT OFFICE 2,481,564

PHYSIOTHERAPY APPARATUS

Axel K. Bjorkman, Waukegan, Ill.

Application February 2, 1946, Serial No. 645,060

1 Claim. (Cl. 4—178)

This invention relates to physiotherapy apparatus. More particularly, this invention relates to physiotherapy apparatus which is especially adapted for use in the treatment of arthritis of the hands and feet.

It is known that the treatment of arthritis, and particularly arthritis of the hands and feet, may be carried out by alternately immersing the hands and feet in hot and cold water. However, apparatus for the application of such alternate hot and cold water baths to the hands and feet is not readily available in the average home, hospital or sanitarium, or like place, and the treatment of this disease in this manner is, therefore, frequently rather difficult as a practical matter.

Accordingly, an object of the present invention is to provide a novel physiotherapy apparatus which is particularly designed and constructed for use in the treatment of arthritis of the hands and feet by the application of alternate hot and cold water baths.

Another object of the invention is to construct and arrange the new physiotherapy apparatus in such a manner that it is portable and may be readily moved from place to place for use in homes, hospitals, sanitariums, and like places.

An additional object of the invention is to provide a novel construction and arrangement of the hot and cold water containers and the supporting means therefor to enable the containers for the hot and cold water to be readily transported into a position which is convenient for use by the patient.

A further object of the invention is to provide a novel construction and arrangement for heating the water in the hot water container without removing the container from the wheel-bearing cart on which the hot and cold containers are mounted for transportation.

Other and further objects of the present invention will be apparent from the following description and claim and are illustrated in the accompanying drawing which, by way of illustration, shows a preferred embodiment of the invention and the principles thereof and what I now consider to be the best mode in which I have contemplated applying those principles. Other embodiments of the invention embodying the same or equivalent principles may be used and structural changes may be made as desired by those skilled in the art without departing from the present invention and the purview of the appended claim.

In the drawings:

Fig. 1 is a central vertical sectional view illustrating a preferred embodiment of the present invention;

Fig. 2 is a top plan view thereof; and

Fig. 3 is a diagrammatic view illustrating a suitable electrical circuit which may be embodied in the invention for energizing and controlling the electrical heating element embodied therein.

A preferred embodiment of the invention is illustrated in the drawings and includes a wheel-bearing cart 10 which comprises an elongated supporting base or body 11 having a pair of rear wheels 12 which are carried by journals 37 which are rotatably mounted in a supporting bracket 13 which is suspended from the body 11 of the cart 10.

The wheel-bearing cart 10 also includes a pair of front wheels 14 which are carried by journals 18 which are rotatably mounted in a bracket 15 which is swivelly mounted, as at 16, upon the body 11 of the cart 10. A forwardly extending arm 17 is attached to the front axle bracket 15 between the front wheels 14 and has a handle attached thereto for pulling the cart 10 from place to place.

As shown in Fig. 1, the cart 10 includes an upstanding retaining wall 23 which may be formed as an integral part of the body or base 11 of the cart 10 and extends around the marginal edge of the base 11 on the upper side thereof.

The new physiotherapy apparatus includes a cold water container 20, which may be made of any suitable material such, for example, as metal or the like, and is preferably oval shaped in plan, as shown in Fig. 2. As shown in Fig. 1, the container 20 includes a bottom wall 21 and a peripheral flange 22 which is formed by that portion of the side wall of the container which projects below the bottom wall 21 and rests upon the upper surface of the body 11 of the cart 10 and is retained thereon by the upstanding retaining wall 23 on the body 11 of the cart 10.

The new physiotherapy apparatus also includes a hot water container 24 which likewise may be made of any suitable material such, for example, as aluminum or other like material, and includes a heat-conductive bottom wall 25 below which there extends a peripheral flange 26 which is formed by an extension of the side wall of the hot water container 24.

The peripheral flange 26 of the hot water container 24 rests on the bottom wall 11 of the wheel-bearing cart 10 and is retained in position thereon by the upstanding retaining wall 23 of the cart 10.

The hot water container 24 includes a supporting plate 27 which is oval shaped in plan and is rockably mounted in the hot water container 24 upon a rock shaft 28 which has its end portions 29 journaled in suitable bearing brackets 39 which are attached to the side walls of the hot water container 24 on the inner side thereof and in any suitable manner, as by welding or soldering. As shown in the drawing, the rock shaft 28 extends through and is fastened in a sleeve 40 which is formed integrally with the plate 20 and extends thereacross.

An electric heating element 30 is arranged within an electrically non-conductive but heat-conductive casing 31 which may be mounted in any suitable manner upon the front end portion 34 of the upstanding retaining wall 23 of the cart 11 below the position occupied by the bottom wall 25 of the hot water container 24 when the latter is in position of use upon the base 11 of the cart 10. The casing 31 may be made of any suitable electrically non-conductive but heat-conductive material such, for example, as asbestos, thermosetting resinous materials, or the like.

As shown in Fig. 3, the electrical heating element 30 is arranged within an electrical circuit 32 which has an outlet or connector plug 33 mounted in the front end portion 34 of the upstanding retaining wall 23 for connection with an electrical cord 35 which may lead to a wall outlet or other suitable source of electric power. The electrical circuit 32 also includes a thermostatic control element 36, which may be of any suitable design and construction, and which may be mounted on the front end portion 34 of the upstanding retaining wall 23 of the cart 10 below the plug or connector 33.

The connector plug or outlet 33 projects through a slot 38 which is formed in and extends to the bottom of the lower front end portion of the vertically extending bottom flange 26 of the hot water container 24 so that the latter may be placed in and removed from position of use without disturbing the outlet plug 33.

In the use of the new physiotherapy apparatus the hot and cold water containers 24 and 20, respectively, may be mounted on the bottom wall 11 of the wheel-bearing cart 10 and when so positioned are held in place by the upstanding marginal retaining wall 23 which surrounds the base 11 of the cart 10. It will be noted that the containers 20 and 24 are elliptical in shape and when in position of use their long axes extend crosswise of the long axis of the rectangular base 11 of the cart 10. This arrangement facilitates bringing the cart 10 and the containers 20 and 24 carried thereby into a position adjacent to and in close proximity with a chair, bed, or the like, from which the patient or user thereof may insert his or her hands or feet alternately into the hot and cold water containers 24 and 20, respectively.

It will also be noted that the elliptical shape of the containers 20 and 24 and the position of their long axes crosswise relative to the long axis of the elongated base 11 of the wheel-bearing cart 10 facilitates the insertion of the patient's feet alternately into the containers 20 and 24 when the cart 10 and the containers are in position of use.

The hot and cold water containers 24 and 20, respectively, are both smaller at the bottom than at the top thereof and when in position of use the lower end portions 22 and 26 of their vertically extending side walls fit snugly within the retaining wall 23 with the upper edge portions 39 of the side walls being in close proximity (Fig. 2). This arrangement facilitates maintaining the containers 20 and 24 in upright position upon but against sliding or tipping movement in or relative to the elongated base 11 of the wheel-bearing cart 10.

It will further be noted that the hot water container 24 may be filled up to a suitable height and the outlet cord 35 attached to the plug 33 so as to energize the heating element 30, whereupon heat will be transmitted through the heat-conductive bottom wall 25 of the hot water container 24 to heat the water therein to a suitable temperature. When this temperature is reached the thermostatic control element 36, which may be of any suitable design and construction, will automatically open the circuit 32 to the heating element 30 and will thus prevent the water in the hot water container 24 from becoming overheated.

In the use of the new physiotherapy apparatus, the affected hand or foot of the patient may be alternately immersed for a prescribed length of time in the hot and cold water containers 24 and 20, respectively. Such alternate immersion stimulates the circulation of the blood in the affected hand or foot of the patient with resulting benefits to the patient or user.

In the use of the hot water container 24, the patient may place his or her hand or foot upon the rockable plate 27 and rock the same upon its supporting rock shaft 28, thereby agitating the hot water in the hot water container 24 so as to distribute the heat from the heating element 30 substantially uniformly throughout the entire volume or body of water in the hot water container 24.

It will thus be seen from the foregoing description, considered in conjunction with the accompanying drawings, that the present invention provides a new and improved physiotherapy apparatus having the desirable advantages and characteristics, and accomplishing its intended objects, including those hereinbefore pointed out and others which are inherent in the invention.

I claim:

A physiotherapy apparatus especially adapted for the treatment of arthritis of the hands and feet and comprising a portable cart including a wheel-bearing horizontally extending supporting base having an upstanding retaining wall extending around the marginal edge of the base, a pair of substantially elliptical-shaped liquid containers co-axially arranged upon the supporting base of the said portable cart, within the said upstanding retaining wall thereon, and with their long axes arranged at substantially a right angle to the front to rear axis of the said portable cart, each of the said liquid containers including a vertically extending side wall and the said vertically extending side walls having their lower-end portions fitting within the said upstanding retaining wall and retained thereby against sliding or tipping movement upon and relative to the said horizontally extending supporting base of the said portable wheel bearing cart, one of the said liquid containers including a horizontally extending bottom wall extending thereacross above the lower end portion of the vertically extending side wall of the said one of the said liquid containers, the said physiotherapy apparatus including an electrical circuit embodying an electrical heating element disposed below the said horizontally extending bottom wall of the said one liquid container for electrically heating liquid therein, the said one liquid container including a plate member rockably mounted in the lower end portion thereof and adapted to support the hand or foot of the user rested thereon during use of the said physiotherapy apparatus, the said one of the said liquid containers having the said plate member rockably mounted therein being adapted to contain a hot liquid and the other one of the said liquid containers being adapted to contain a cold liquid whereby the user of the said physiotherapy apparatus may alternately subject an affected hand or foot to the action of hot liquid in the said one liquid container, agitated by the action of the affected hand or foot in rocking the said plate member, and to the action of a cold liquid in the said other one of the said liquid containers.

AXEL K. BJORKMAN.

REFERENCES CITED

The following references are of record in the file of this patent:

UNITED STATES PATENTS

| Number | Name | Date |
|---|---|---|
| 654,973 | Haeckel | July 31, 1900 |
| 1,063,614 | Stanley et al. | June 3, 1913 |
| 2,321,981 | Bowers | June 15, 1943 |
| 2,392,208 | Wilken | Jan. 1, 1946 |